United States Patent
Kao et al.

(10) Patent No.: US 7,106,597 B2
(45) Date of Patent: Sep. 12, 2006

(54) AUTOMATIC RETRACTABLE DEVICE OF FLEXIBLE PRINTED CIRCUIT BOARD

(75) Inventors: Chih-Wei Kao, Taoyuan (TW); Cheng-Cheng Lee, Taipei Hsien (TW); Chih-Wei Lee, Taoyuan (TW)

(73) Assignee: Quanta Computer, Inc., Taoyuan Shien (TW)

( * ) Notice: Subject to any disclaimer, the term of this patent is extended or adjusted under 35 U.S.C. 154(b) by 208 days.

(21) Appl. No.: 10/882,356

(22) Filed: Jul. 2, 2004

(65) Prior Publication Data

US 2005/0133327 A1 Jun. 23, 2005

(30) Foreign Application Priority Data

Dec. 22, 2003 (TW) .............................. 92222428 U

(51) Int. Cl.
*G02B 13/02* (2006.01)

(52) U.S. Cl. .................... 361/748; 361/756; 191/12 R; 191/12.4; 439/164

(58) Field of Classification Search ................ 361/748, 361/749, 756, 741, 752, 759, 802, 829; 439/67, 439/76.1, 164, 15; 191/12 R, 12.2 R, 12.4, 191/12.2 A; 248/424, 429, 430
See application file for complete search history.

(56) References Cited

U.S. PATENT DOCUMENTS

| | | | | |
|---|---|---|---|---|
| 5,195,079 A | * | 3/1993 | Inoue et al. | 720/635 |
| 5,673,182 A | * | 9/1997 | Garner | 361/829 |
| 5,755,422 A | * | 5/1998 | Susko et al. | 248/430 |
| 6,158,595 A | * | 12/2000 | Wark et al. | 211/41.17 |

* cited by examiner

*Primary Examiner*—Frantz F. Jules
(74) *Attorney, Agent, or Firm*—Rabin & Berdo, PC

(57) ABSTRACT

An automatic retractable device of a flexible printed circuit board is described. The automatic retractable device of the flexible printed circuit board comprises a bracket, two elastic components and two rollers. By combining the elastic components, the rollers and the flexible printed circuit board, the flexible printed circuit board can revert to an original position after the flexible printed circuit board is used.

17 Claims, 3 Drawing Sheets

AUTOMATIC RETRACTABLE DEVICE OF FLEXIBLE PRINTED CIRCUIT BOARD

FIELD OF THE INVENTION

The present invention relates to an automatic retractable device, and more particularly, to an automatic retractable device of a flexible printed circuit (FPC) board.

BACKGROUND OF THE INVENTION

Printed circuit boards are basic components of electronic products. Printed circuit boards are classified into two sorts according to their substrates: rigid printed circuit boards and flexible printed circuit boards. The rigid printed circuit board is principally applied in a motherboard or a peripheral card of a computer, a communication product, such as a board of a mobile phone, or a board of a consumer product. The flexible printed circuit board is widely used, and the flexible printed circuit board can be divided into four sorts according to functions: lead line, printed circuit, connector, and integration function system.

The basic portion of a flexible printed circuit board is a film, which is used to support circuits composed of copper pieces. Because the flexible printed circuit board has properties of lightness, soft, thinness, smallness, ductility, flexibility and high wiring density, the flexible printed circuit board can be three-dimensionally wired and the shape of the flexible printed circuit board can be changed according to space limitations. The flexible printed circuit board is therefore typically applied in tiny products, such as notebook (NB), mobile phone, personal digital assistant (PDA) and information appliance (IA). For example, the flexible printed circuit board can be used as a connection between a liquid crystal display (LCD), a floppy disk driver (FDD), a hard disk driver (HDD) or a compact disc read only memory driver (CD-ROM) to a motherboard; a connection between a component, such as slot or far-infrared ray transmission, to a motherboard in a high-end level notebook; tone push-buttons of a mobile phone or a personal digital assistant; and a connection between a microphone or numeral keys and a panel of a liquid crystal display.

SUMMARY OF THE INVENTION

One objective of the present invention is to provide an automatic retractable device of a flexible printed circuit board. In the automatic retractable device of the flexible printed circuit board, the flexible printed circuit board can revert to an original position after the flexible printed circuit board is used by a simple combination of elastic components and rollers, and using the curved property of the flexible printed circuit board. Therefore, the installation of the automatic retractable device is quite easy and uncomplicated.

Another objective of the present invention is to provide an automatic retractable device of a flexible printed circuit board, use of which ensures that the flexible printed circuit board can automatically revert to an original position after the flexible printed circuit board is used.

According to the aforementioned objectives, the present invention further provides an automatic retractable device of a flexible printed circuit board comprising elements as follows. A bracket comprises a faceplate and two opposite side plates. The side plates are located on two opposite sides of the faceplate, a first end of each side plate comprises a hook, and each side plate comprises a slide. A first roller is connected to a second end of each side plate. A second roller comprises two ends, and each of the two ends of the second roller has a protruding portion. The second roller is installed in the slide of each side plate and each protruding portion of the second roller protrudes out of the slide on the same side. The flexible printed circuit board comprises two curves respectively wrapping the first roller and the second roller, and the flexible printed circuit board is located in the bracket and extending out of two ends of the bracket. Two elastic components are respectively located on two sides of the bracket. Each elastic component is connected to the protruding portion of the second roller and the hook on the same side.

According to a preferred embodiment of the present invention, the slide of each side plate is near the second end of each side plate, and the elastic components are preferably springs.

With the simple combination of two elastic components and two rollers, the flexible printed circuit board can revert automatically its original position after the flexible printed circuit board is used.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The present invention discloses an automatic retractable device of a flexible printed circuit board, in which use of a simple combination of elastic components and rollers ensures that the flexible printed circuit board can automatically revert to its original position after use. In order to make the illustration of the present invention more explicit and complete, the following description is stated with reference to FIGS. 1–3.

Figure 1:
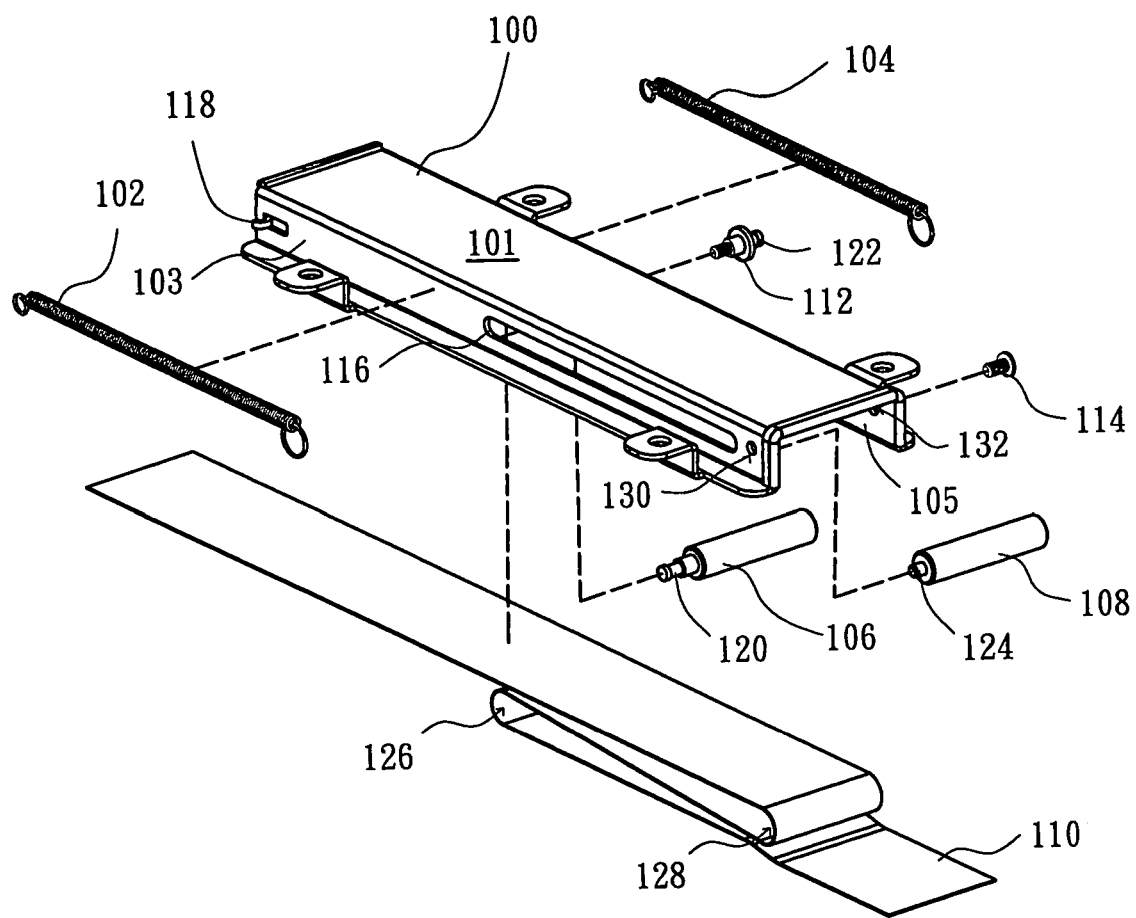
FIG. 1 illustrates a schematic diagram showing the deconstruction of an automatic retractable device of a flexible printed circuit board in accordance with a preferred embodiment of the present invention.

Referring to FIG. 1, FIG. 1 illustrates an exploded diagram showing the installation of an automatic retractable device of a flexible printed circuit board in accordance with a preferred embodiment of the present invention. The automatic retractable device of the flexible printed circuit board is composed of a bracket 100, an elastic components (102, 104), and rollers (106, 108). The bracket 100 is mainly composed of a faceplate 101 and side plates (103, 105). The shape of the bracket 100 is preferably an inverted-U shape, and the side plate 103 and the side plate 105 are connected to two opposite sides of the bracket 100. Each of one end of the side plate 103 and one end of the side plate 105 comprises a hook 118, and each of the other ends of the side plate 103 and the side plate 105 comprises a slide 116. Furthermore, the side plate 103 and the side plate 105 have corresponding holes 130 and 132, respectively. The hole 130 and the hole 132 are preferably respectively located on the same end of the slide 106 of side plate 103 and the side plate 105, and the slides 116 and the hook 118 are preferably nearer than the holes (130, 132) and the hook 118.

One end of the roller 108 has a protruding portion 124, and the other end of the roller 108 has a locking element 114 and a locking hole (not shown in the diagrams), wherein the locking hole is able to contain the locking element 114. When the roller 108 is installed in the bracket 100, the protruding portion 124 of the roller 108 is inserted into the hole 130 of the side plate 103, and the locking element 114 is passed through the hole 132 of the side plate 105 and is locked into the locking hole of the roller 108, so as to locate the roller 108 under the faceplate 101 and connect the roller 108 between the side plate 103 and the side plate 105. The roller 108 can roll between the side plate 103 and the side plate 105. In the preferred embodiment, the roller 108 is preferably located at the other end opposite the hook 118 of each side plate 103 and side plate 105, and the locking element 114 is preferably a screw.

Further, one end of the roller 106 also has a protruding portion 120, and the other end of the roller 106 has a locking element 112 and a locking hole (not shown in the diagrams) that is able to contain the locking element 112. One end of the locking element 112 has a protruding portion 122. When the roller 106 is installed in the bracket 100, the protruding portion 120 of the roller 106 is first passed through the slide 116 of the side plate 103, and the locking element 112 is passed through the slide 116 of the side plate 105 and is locked into the locking hole of the roller 106, so as to locate the roller 106 under the faceplate 101 and connect the roller 106 between the side plate 103 and the side plate 105. The protruding portion 120 and the protruding portion 122 of the roller 106 respectively protrude from the slide 116 of the side plate 103 and the slide 116 of the side plate 105 out of the side plate 103 and the side plate 105, and the roller 106 can roll in the slide 116 of the side plate 103 and the slide 116 of the side plate 105. In the preferred embodiment, the locking element 112 can be, for example, a screw.

The elastic component 102 and the elastic component 104 are respectively located on two opposite sides of the bracket 100 and outside of the side plate 103 and the side plate 105. One end of the elastic component 102 is hitched on the hook 118 of the side plate 103, and the other end of the elastic component 102 is hitched on the protruding portion 120 of the roller 106. One end of the elastic component 104 is hitched on the hook 118 of the side plate 105, and the other end of the elastic component 104 is hitched on the protruding portion 122 of the roller 106. In the preferred embodiment, the elastic component 102 and the elastic component 104 can be, for example, springs.

Figure 2:
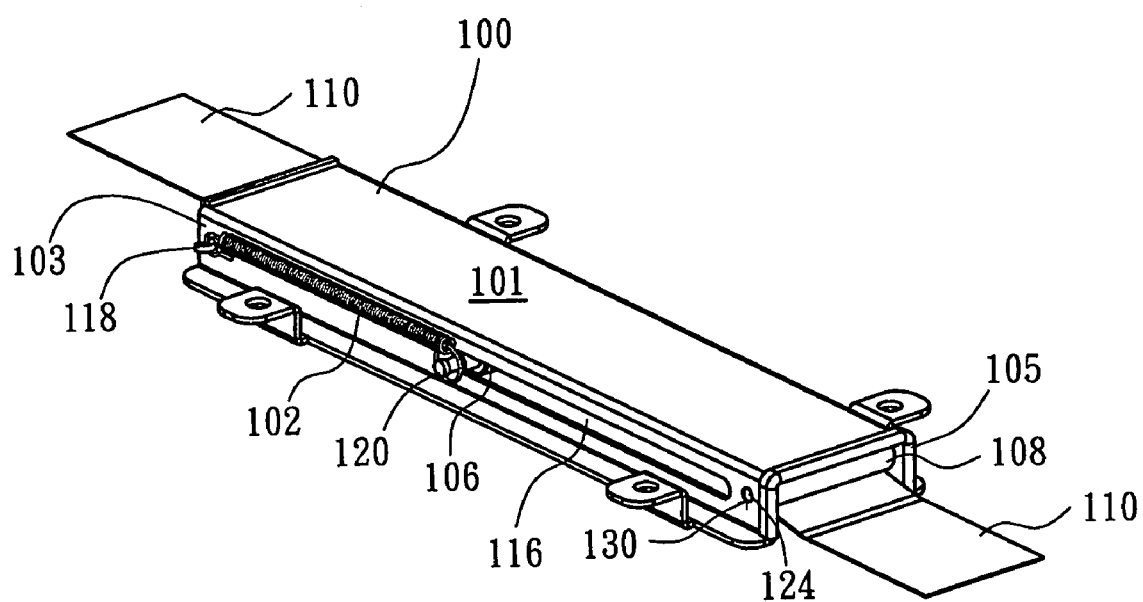
FIG. 2 illustrates a three-dimensional diagram showing an automatic retractable device of a flexible printed circuit board in accordance with a preferred embodiment of the present invention, wherein the flexible printed circuit board is in the original position.

In the preferred embodiment of the present invention, when a flexible printed circuit board 110 is installed in the automatic retractable device, the flexible printed circuit board 110 is bent into three portions and two curves (126, 128) (referring to FIG. 1) are formed. The flexible printed circuit board 110 is located in the bracket 100, and two ends of the flexible printed circuit board 110 extend out of two ends of the bracket 100 (referring to FIG. 2 and FIG. 3). The roller 108 is wrapped by the curve 128, and the roller 106 is wrapped by the curve 126. After the installation of the flexible printed circuit board 110 and the automatic retractable device is completed, a structure, as shown in FIG. 2, is formed. FIG. 2 illustrates a three-dimensional diagram showing an automatic retractable device of a flexible printed circuit board in accordance with a preferred embodiment of the present invention. The flexible printed circuit board is in its original position.

As illustrated in FIG. 2, when the flexible printed circuit board 110 is not in use, the flexible printed circuit board 110 is in its original position. At this time, the roller 106 is at the end of the slide 116 near the hook 118, a distance between the roller 106 and the roller 108 is the farthest, and the elastic component 102 and the elastic component 104 are at a lower extended state, or even a relaxed state.

Figure 3:
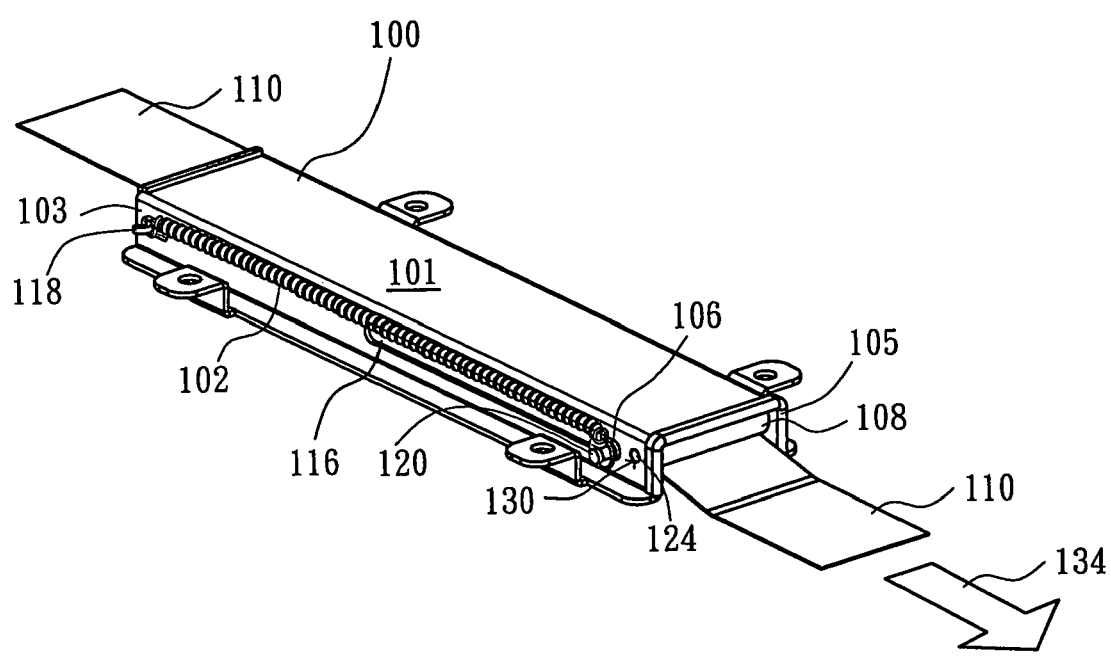
FIG. 3 illustrates a three-dimensional diagram showing an automatic retractable device of a flexible printed circuit board in accordance with a preferred embodiment of the present invention, wherein the flexible printed circuit board is a use position.

Referring to FIG. 3, FIG. 3 illustrates a three-dimensional diagram showing an automatic retractable device of a flexible printed circuit board in accordance with a preferred embodiment of the present invention, in which the flexible printed circuit board is at a use position. When the flexible printed circuit board 100 is in use, the flexible printed circuit board 100 can be coupled to, for example, a printed circuit board of a system panel, and a front end of the flexible printed circuit board 110 needs to be pulled in a direction 134 toward the printed circuit board of the system panel, and be coupled and fixed on the printed circuit board of the system panel. When the flexible printed circuit board 110 is pulled out from the front end of the flexible printed circuit board 110, the flexible printed circuit board 110 drives the roller 108 and the roller 106, thus making the roller 108 roll to mark time between the side plate 103 and the side plate 105, and the roller 106 roll toward the roller 108 along the slides 116 of the side plate 103 and the side plate 105. When the roller 106 rolls toward the roller 108, the elastic component 102 and the elastic component 104 are stretched by the roller 106, and thus putting the elastic component 102 and the elastic component 104 in the extended state.

When the flexible printed circuit board 110 is not in use, the flexible printed circuit board 110 is separated from the printed circuit board of the system panel. At this time, with the elasticity of the elastic component 102 and the elastic component 104, the roller 106 is pulled back toward the hook 118 along the slides 116. The rolling of the roller 106 drives the flexible printed circuit board 110, and the flexible printed circuit board 110 drives the roller 108, so that the flexible printed circuit board 110 is pulled back to the original position before the flexible printed circuit board 110 is used.

According to the aforementioned description, one advantage of the present invention is that the automatic retractable device of a flexible printed circuit board of the present invention can automatically revert to the original position after the flexible printed circuit board is used by use of a simple combination of elastic components and rollers, as well as the flexibility of the flexible printed circuit board. The complexity of the device is thus not increased.

According to the aforementioned description, another advantage of the present invention is that with the application of the automatic retractable device of a flexible printed circuit board of the present invention, it can be ensured that the flexible printed circuit board can automatically revert to the original position after the flexible printed circuit board is used.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An automatic retractable device of a flexible printed circuit board, comprising:
   a bracket comprising a faceplate and two opposite side plates, wherein the side plates are located on two opposite sides of the faceplate, a first end of each side plate comprises a hook, and each side plate comprises a slide;
   a first roller connected to a second end of each side plate, wherein each slide is near the second end of each side plate;
   a second roller, wherein each of two ends of the second roller has a protruding portion, the second roller is installed in the slide of each side plate and the protruding portions of the second roller protrude out of the slides, wherein the flexible printed circuit board comprises two curves respectively wrapping the first roller and the second roller, and wherein the flexible printed circuit board is located in the bracket and extending out of two ends of the bracket; and
   two elastic components respectively located on two sides of the bracket, wherein each elastic component is connected to the protruding portion of the second roller and the hook on the same side.

2. The automatic retractable device of the flexible printed circuit board according to claim 1, wherein the slide of each of the side plates is near the second end of each of the side plates.

3. The automatic retractable device of the flexible printed circuit board according to claim 1, wherein the elastic components are springs.

4. The automatic retractable device of the flexible printed circuit board according to claim 1, wherein the side plates comprise two joint holes respectively located on the second end of each of the side plates.

5. The automatic retractable device of the flexible printed circuit board according to claim 4, wherein the first roller comprises a protruding portion, a locking hole and a locking element, the joint holes respectively contain the protruding portion of the first roller and the locking element, and the locking element is passed through one of the joint holes and connected to the locking hole.

6. The automatic retractable device of the flexible printed circuit board according to claim 5, wherein the locking element is a screw.

7. The automatic retractable device of the flexible printed circuit board according to claim 1, wherein the second roller comprises a locking hole, one of the protruding portions of the second roller is a locking element, and the locking element is connected to the locking hole.

8. The automatic retractable device of the flexible printed circuit board according to claim 7, wherein the locking element is a screw.

9. An automatic retractable device of a flexible printed circuit board, comprising:
   a bracket, wherein the bracket comprises a faceplate and two opposite side plates connected to two sides of the faceplate, each side plate comprises a hook and a slide, and the hook of each side plate is located on a first end of each side plate;
   a first roller located between the side plates and connected to a second end of each side plate, wherein each slide is near the second end of each side plate;
   a second roller located between the side plates, wherein the second roller is passed through and protrudes out of the slide of each side plate, the flexible printed circuit board comprises two curves respectively wrapping the first roller and the second roller, and the flexible printed circuit board is located in the bracket and extends out of two ends of the bracket; and
   an elastic component located on the side plates, wherein two ends of the elastic component are respectively connected to the hook and one end of the second roller on the same side.

10. The automatic retractable device of the flexible printed circuit board according to claim 9, wherein the slide of each side plate is near the second end of each side plate.

11. The automatic retractable device of the flexible printed circuit board according to claim 9, wherein the elastic component is a spring.

12. The automatic retractable device of the flexible printed circuit board according to claim 9, wherein the side plates comprise two joint holes respectively located on the second end of each side plate.

13. The automatic retractable device of the flexible printed circuit board according to claim 12, wherein the first roller comprises a protruding portion, a locking hole and a locking element, the joint holes respectively contain the protruding portion of the first roller and the locking element, and the locking element is passed through one of the joint holes and connected to the locking hole.

14. The automatic retractable device of the flexible printed circuit board according to claim 13, wherein the locking element is a screw.

15. The automatic retractable device of the flexible printed circuit board according to claim 9, wherein two ends of the second roller comprise two protruding portions respectively protruding out of the slide of each side plate.

16. The automatic retractable device of the flexible printed circuit board according to claim 15, wherein the second roller further comprises a locking hole, one of the protruding portions of the second roller is a locking element, and the locking element is connected to the locking hole.

17. The automatic retractable device of the flexible printed circuit board according to claim 16, wherein the locking element is a screw.

* * * * *